Patented Aug. 11, 1953

2,648,691

UNITED STATES PATENT OFFICE 2,648,691

STABILIZATION OF ORGANIC COMPOUNDS

Ralph B. Thompson, Hinsdale, Ill., assignor to Universal Oil Products Company, Chicago, Ill., a corporation of Delaware No Drawing. Application August 23, 1950,
Serial No. 181,099

10 Claims. (Cl. 260—398.5)

This invention relates to the stabilization of organic compounds which tend to deteriorate in storage or in use due to oxidation reactions.

Various organic compounds including motor fuel, particularly cracked gasoline, polymer gasoline, diesel oil, etc., mineral oil, lubricating oil, fuel oil, drying oil, greases, rubber, edible fats and oils, etc., are adversely affected by oxygen, with the resultant formation of undesirable gum, discoloration, rancidity or other deleterious reactions.

The invention is particularly applicable to the stabilization of edible fats and oils which generally are of animal or vegetable origin and which tend to become rancid, especially during long periods of storage prior to use. Typical representatives of these edible fats and oils include linseed oil, menhaden oil, cod liver oil, castor oil, olive oil, rapeseed oil, coconut oil, palm oil, corn oil, sesame oil, peanut oil, babassu oil, butter, fat, lard, beef tallow, etc., as well as hydrogenated oils and fats as sold under various trade names including "Spry," "Crisco," "Snowdrift," etc. It is understood that other oils, and fats may be treated within the scope of the present invention, including oils and fats which have previously been subjected to various treatments, such as blowing with air, heat treatment, etc.

One embodiment of this invention relates to a method of stabilizing an organic material subject to oxidative deterioration which comprises adding thereto an inhibitor selected from the members of the group consisting of a beta-thiaketo sulfoxide and a beta-thiaketo sulfone.

Another embodiment of this invention relates to a method of stabilizing edible fats and oils aaginst rancidity which comprises incorporating therein an inhibitor selected from the members of the group consisting of a beta-thiaketo sulfoxide and a beta-thiaketo sulfone.

A further embodiment of this invention relates to a method of stabilizing edible fats and oils against rancidity which comprises incorporating therein an inhibitor comprising a beta-thiaketo sulfoxide.

A still further embodiment of this invention relates to a method of stabilizing edible fats and oils against rancidity which comprises incorporating therein an inhibitor comprising a beta-thiaketo sulfone.

The preferred inhibitors of the present invention are prepared by reacting a beta-mercapto ketone with a member of the group consisting of an unsaturated sulfoxide and an unsaturated sulfone to form beta-thiaketo sulfoxides and beta-thiaketo sulfones respectively.

Beta-mercapto ketones used as starting materials in the process are represented by the formula:

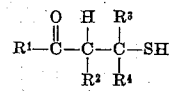

wherein each of $R^1$ to $R^4$ inclusive is separately and independently selected from the members of the group consisting of a hydrogen atom, a hydrocarbon group, and a heterocyclic group. The hydrocarbon groups which are represented by $R^1$ to $R^4$ include alkyl, alkenyl, cycloalkyl, cycloalkalkyl, aryl and alkaryl groups. The heterocyclic groups also referred to above include a thiophene group, a furan group, and a pyridine group.

The unsaturated sulfoxides and sulfones which are condensed with the aforementioned beta-mercapto-ketones are represented by the formula:

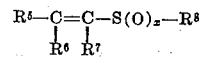

wherein each of $R^5$ to $R^7$ inclusive separately and independently represents a member of the group consisting of a hydrogen atom, a hydrocarbon group, and a heterocyclic group, $R^8$ represents a member of the group consisting of a hydrocarbon group and a heterocyclic group, and $x$ is a small whole number selected from 1 and 2. The hydrocarbon groups $R^5$ to $R^8$ include alkyl, alkenyl, cycloalkyl, cycloalkalkyl, aryl, and alkaryl groups while the heterocyclic group includes a thiophene ring, a furan ring, and a pyridine ring. Highly active unsaturated sulfoxides and sulfones include the vinyl sulfoxides and sulfones in which case the groups $R^5$ to $R^7$ represent hydrogen atoms.

The beta-mercapto-ketones used as a starting material in this process may be prepared by reacting an excess of hydrogen sulfide with an unsaturated ketone represented by the formula:

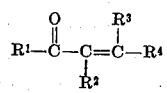

wherein each of $R^1$ to $R^4$ represents a member of the ground consisting of a hydrogen atom, a hydrocarbon group and a heterocyclic group as set forth hereinabove. The reaction of hydrogen sulfide with an alpha-beta-unsaturated ketone is effected readily by contacting these reactants generally at a temperature of from about 0° to about 100° C. and preferably in the presence of a catalyst. Ketones containing at least one hydrogen atom combined with the carbon atom in beta position to the keto group react readily with hydrogen sulfide in the presence of a basic catalyst such as piperidine, sodium methylate, quatternary ammonium hydroxides and other basic-acting catalysts. In some cases, it is desirable to heat the reaction mixture at a temperature of from about 50° to about 100° C. in order to promote reaction. It is necessary to use a large excess of hydrogen sulfide in order to avoid the reaction of two molecules of alpha, beta-unsaturated ketone with one molecule of hydrogen sulfide which would produce a diketo-sulfide rather than the desired beta-mercapto-ketone.

Unsaturated sulfoxides such as alkyl, alkenyl, sulfoxides are prepared by oxidizing alkyl beta-chloroalkyl sulfides with one equivalent of 30% hydrogen peroxide while the sulfones are prepared similarly from the same starting materials by using an excess of the 30% hydrogen peroxide, that is, by using at least two molecular proportions of hydrogen peroxide per molecular proportion of alky-beta-chloroalkyl sufide. The alkyl beta-chloroalkyl sulfides are produced, for example, by condensing an alkyl mercaptan with an excess of a symmetrical alkylene dichloride in the presence of a sodium alcoholate so as to split out one molecular proportion of hydrogen chloride as illustrated by the following equation:

$C_2H_5SH + ClCH_2-CH_2-Cl + CH_3ONa \rightarrow$
$\quad ClCH_2-CH_2-S-C_2H_5 + NaCl + CH_3OH$ The condensation products of these beta-mercaptoketones with unsaturated sulfoxides and sulfones which are employed as inhibitors of oxidation according to the process of this invention are illustrated by the following general formula:

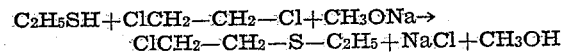

wherein each of $R^1$ to $R^7$ is separately and independently selected from the members of the group consisting of hydrogen, and alkyl, alkenyl, cycloalkyl, cycloalkalkyl, aryl, alkaryl, and heterocyclic groups and $R^8$ represents a member of the group consisting of alkyl, alkenyl, cycloalkyl, cycloalkalkyl, aryl, alkaryl, and heterocyclic groups, and $x$ represents a whole number selected from 1 and 2. Also it is understood that these substituent groups may in turn be substituted by radicals such as hydroxyl, amino, monoalkylamino, dialkylamino, etc. In another form of the invention $R^3$ and $R^4$ or $R^5$ and $R^6$ may comprise carbon atoms forming a polymethylene ring.

The method of producing alkyl-thia-ketoalkyl sulfoxides and sulfones according to the process of this invention is illustrated by the following equations:

(1) $CH_3COCH=CH_2 + H_2S \rightarrow CH_3COCH_2CH_2SH$ (2) $CH_3COCH_2CH_2SH + CH_2=CHSOC_2H_5 \rightarrow$
$\quad CH_3COCH_2CH_2SCH_2CH_2SOC_2H_5$ (3) $CH_3COCH_2CH_2SH + CH_2=CHSO_2C_2H_5 \rightarrow$
$\quad CH_3COCH_2CH_2SCH_2CH_2SO_2C_2H_5$ As indicated by these equations, methyl vinyl ketone is reacted with hydrogen sulfide to form methyl beta-mercaptoethyl ketone and the last-named compound is then condensed with vinyl ethyl sulfoxide according to the second equation and with vinyl ethyl sulfone according to the third equation to form ethyl 3-thia-6-ketoheptyl sulfoxide and ethyl 3-thia-6-ketoheptyl sulfone, respectively. These desired thiaketo sulfoxides and sulfones may also be produced by other means, for example, vinyl ethyl sulfone is reacted with hydrogen sulfide according to the equation:

$CH_2=CHSO_2C_2H_5 + H_2S \rightarrow HSCH_2-CH_2SO_2C_2H_5$

The resultant product is then condensed with methyl vinyl ketone to form ethyl 3-thia-ketoheptyl sulfone as illustrated by the following equation:

$CH_3COCH=CH_2 + HSCH_2-CH_2SO_2C_2H_5 \rightarrow$
$\quad CH_3COCH_2CH_2SCH_2SO_2C_2H_5$ Another method of producing a thia-keto sulfone involves, for example, reacting the sodium salt of methyl beta-mercaptoethyl ketone with the beta-chloroethyl sulfone which is produced by the oxidation of the beta-chloro sulfide in the hydrogen peroxide as illustrated by the following equations:

$ClC_2H_4SC_2H_5 + 2H_2O_2 \rightarrow ClC_2H_4SO_2C_2H_5$ $CH_3COCH_2CH_2SNa + ClCH_2CH_2SO_2C_2H_5 \rightarrow$
$\quad CH_3COCH_2CH_2SCH_2CH_2SO_2C_2H_5$ These condensations of beta-mercapto ketones, for example, with vinyl ethyl sulfone or vinyl ethyl sulfoxide are carried out preferably in the presence of a basic catalyst such as piperidine, sodium methylate, quaternary ammonium hydroxide and other basic acting catalysts. In some cases, it is advisable to heat the reaction mixture at a temperature of from about 50° to about 100° C. in order to promote the reaction.

It is understood that a large number of compounds may be produced and used within the broad scope of the present invention but that, while all these compounds have some inhibitor potency in stabilizing organic materials, they are not necessarily of equivalent activities.

An inhibitor of the present invention is generally added to organic materials subject to oxidative deterioration in amounts of less than 1% by weight. When used in edible fats and oils, the inhibitor is generally employed in an amount of from about 0.001% to about 0.5% by weight and when used in gasoline the inhibitor is usually in amounts above 0.02% by weight. The inhibitor may be used alone or in conjunction with synergists, inhibitor activators, dyes, antiknock agents, etc., depending upon the materials to be stabilized. For example, when used in edible fats and oils, a synergist such as phosphoric acid, citric acid, or ascorbic acid, will generally be used along with the inhibitor. When used in gasoline, lead tetraethyl, a dye, and perhaps an inhibitor activator, such as certain types of alkylene polyamines, may be used.

The following example is introduced to illustrate further the novelty and utility of the present invention, but not with the intention of unduly limiting the same.

The beta-mercapto ketone used as a starting material in the preparation of beta-thiaketo sulfoxides and beta-thiaketo sulfones was obtained by reacting methyl vinyl ketone with a molecular proportion of hydrogen sulfide in the presence of piperidine. The resultant methyl beta-mercaptoethyl ketone was then condensed with ethyl vinyl sulfone also in the presence of piperidine to form ethyl 3-thia-6-ketoheptyl sulfone as indicated by the following equation:

$CH_2=CHSO_2C_2H_5 + HSCH_2CH_2COCH_3 \xrightarrow{\text{piperidine}}$
ethyl vinyl sulfone · methyl-beta-mercaptoethyl-ketone $C_2H_5SO_2CH_2CH_2SCH_2CH_2COCH_3$
ethyl 3-thia-6-ketoheptyl sulfone The ethyl vinyl sulfone used in the condensation reaction represented in the above equation was produced as follows: To a solution of sodium methylate (54 grams, 1 mole) in methanol (150 cc.) was added ethyl mercaptan (62 grams, 1 mole). This mixture was added slowly to ethylene dichloride (500 cc.) with vigorous stirring and the mixture then boiled under reflux one hour. Sodium chloride was removed by filtration and the filtrate distilled. The methanol and excess ethylene dichloride form an azeotrope boiling at above 60° C. The higher boiling material was distilled in vacuo giving two products, $ClC_2H_4SC_2H_5$ B. P.$_{22}$ 55–58° C. and
$C_2H_5SC_2H_4SC_2H_5$, B. P.$_{22}$ 99–104° C.

The beta-chloro-sulfide was oxidized in acetic acid solution with an excess of hydrogen peroxide (30%), the solvent and water removed in vacuo, and the residue poured into triethylamine in benzene. After filtration to remove triethylamine hydrochloride, the filtration was distilled giving $CH_2=CHSO_2C_2H_5$ B. P.$_{22}$ 118–119° C., that is, ethyl vinyl sulfone.

Ethyl vinyl sulfoxide which is also condensed with methyl beta-mercaptoethyl ketone to form ethyl thiaketoheptyl sulfoxide was obtained by oxidizing ethyl beta-chloroethyl sulfide in acetic acid with only one equivalent of 30% hydrogen peroxide. The resultant beta-chloroethyl sulfoxide which boiled at 137° to 139° C. at 26 mm. pressure was then dehydrohalogenated by means of tri-ethylamine in benzene to give ethyl vinyl sulfoxide, $CH_2=CHSOC_2H_5$.

Ethyl 3-thia-6-ketoheptyl sulfone synthesized as indicated above was tested as an inhibitor for improving the stability of lard having a normal stability period of five hours as determined by the "Swift" test which is described in detail in an article by A. E. King and others in the journal "Oil and Soap," volume X, number 6, pages 106–109 (1933). In general the test comprises bubbling air through a sample of the lard until rancidity is determined by taste and by peroxide value, the latter being about 20 when rancidity appears. The addition of 0.02% by weight of the ethyl 3-thia-6-keto-heptyl sulfone to this lard increased its normal stability period from 5 hours to 56 hours.

I claim as my invention:

1. An organic sulfur compound represented by the formula

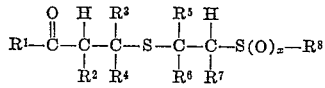

wherein each of $R^1$ to $R^7$ is separately and independently selected from the members of the group consisting of hydrogen, alkyl, alkenyl, cycloalkyl, cycloalkalkyl, aryl, alkaryl groups and a heterocyclic group; $R^8$ represents a member of the group consisting of alkyl, alkenyl, cycloalkyl, cycloalkalkyl, aryl, alkaryl, and heterocyclic groups; and $x$ is a whole number selected from 1 and 2.

2. Ethyl 3-thia-6-ketoheptyl sulfoxide.

3. Ethyl 3-thia-6-ketoheptyl sulfone.

4. An organic sulfur compound as defined in claim 1 further characterized in that said compound is an alkyl thiaketoheptyl sulfoxide.

5. An organic sulfur compound as defined in claim 1 further characterized in that said compound is an alkyl thiaketoheptyl sulfone.

6. An organic sulfur compound as defined in claim 1 further characterized in that said compound is an alkyl thiaketoalkyl sulfoxide.

7. An organic sulfur compound as defined in claim 1 further characterized in that said compound is an alkyl thiaketoalkyl sulfone.

8. A fatty material normally tending to become rancid and containing, as an inhibitor against development of rancidity, an organic sulfur compound represented by the formula

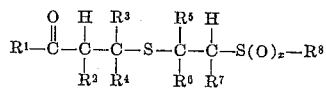

wherein each of $R^1$ to $R^7$ is separately and independently selected from the members of the group consisting of hydrogen, alkyl, alkenyl, cycloalkyl, cycloalkalkyl, aryl, alkaryl groups and a heterocyclic group; $R^8$ represents a member of the group consisting of alkyl, alkenyl, cycloalkyl, cycloalkalkyl, aryl, alkaryl, and heterocyclic groups; and $x$ is a whole number selected from 1 and 2.

9. A fatty material normally tending to become rancid and containing, as an inhibitor against development of rancidity, ethyl 3-thia-6-ketoheptyl sulfoxide.

10. A fatty material normally tending to become rancid and containing, as an inhibitor against development of rancidity, ethyl 3-thia-6-ketoheptyl sulfone.

RALPH B. THOMPSON.

References Cited in the file of this patent

UNITED STATES PATENTS

| Number | Name | Date |
|---|---|---|
| 2,212,150 | Burke | Aug. 20, 1940 |
| 2,492,334 | Thompson | Dec. 27, 1949 |
| 2,492,335 | Chenicek et al. | Dec. 27, 1949 |
| 2,492,336 | Thompson et al. | Dec. 27, 1949 |
| 2,522,670 | Frank | Sept. 19, 1950 |